United States Patent [19]
Hamano et al.

[11] Patent Number: 5,668,894
[45] Date of Patent: Sep. 16, 1997

[54] METHOD FOR PROCESSING THREE-DIMENSIONAL SHAPE DATA

[75] Inventors: Seiji Hamano, Osaka; Takashi Ichiyanagi, Hirakata; Tsuyoshi Nomura, Kyoto; Kouhei Hamamura, Hirakata, all of Japan

[73] Assignee: Matsushita Electric Industrial Co., Ltd., Osaka, Japan

[21] Appl. No.: 277,308

[22] Filed: Jul. 22, 1994

[30] Foreign Application Priority Data

Jul. 23, 1993  [JP]  Japan ................................. 5-182580

[51] Int. Cl.$^6$ ............................................ G06T 5/30
[52] U.S. Cl. .................................. 382/242; 345/442
[58] Field of Search ....................... 364/474.31, 474.29, 364/724.1, 723; 382/256, 199, 241, 316; 356/376, 377; 395/142, 123, 382, 242

[56] References Cited

U.S. PATENT DOCUMENTS

| | | | |
|---|---|---|---|
| 4,503,493 | 3/1985 | Burkhardt et al. | 364/170 |
| 4,627,734 | 12/1986 | Rioux | 356/376 |
| 4,771,474 | 9/1988 | Takashima et al. | 382/242 |
| 4,787,748 | 11/1988 | Rioux | 356/376 |
| 5,287,441 | 2/1994 | Nakamura | 395/142 |

FOREIGN PATENT DOCUMENTS 64-26816  1/1989  Japan .

OTHER PUBLICATIONS

Kyoritsu Shuppan kabushiki Kaisha, "The Basic and Application of the Three Dimensional CAD", Sect. 4.6, 4.6.1, p. 57, Hiroshi Toriya et al., Feb. 25, 1991.

*Primary Examiner*—Michael T. Razavi
*Assistant Examiner*—Larry J. Prikockis
*Attorney, Agent, or Firm*—Wenderoth, Lind & Ponack

[57] ABSTRACT

A method for processing three-dimensional shape data includes steps of obtaining a plurality of point data along a surface of an object having a three-dimensional shape; taking out a point data from the obtained point data to be processed, approximating each specified number of point data in the to-be-processed point data adjacent the taken-out point data by a polynomial and then finding two unit vectors at the taken-out point data; finding an opening angle defined between the two found unit vectors; comparing the found opening angle with a predetermined threshold value of the opening angle, determining whether or not the found opening angle is not larger than the threshold value, and thinning the taken-out point data when the found opening angle is larger than the threshold value and not storing the taken-out point data in a storage unit, and leaving the taken-out point data without the thinning when the found opening angle is not larger than the threshold value and storing the taken-out point data in the storage unit.

6 Claims, 7 Drawing Sheets

ID FOR PROCESSING THREE-
DIMENSIONAL SHAPE DATA

BACKGROUND OF THE INVENTION

The present invention relates to a method for data processing in which a determination is made as to whether or not thinning should be effected upon point data corresponding to a three-dimensional shape obtained along a surface having the three-dimensional shape.

Point data corresponding to a three-dimensional shape are obtained one after another at specified intervals along a surface having the three-dimensional shape (e.g., surfaces of machined parts or sample products) and contained and stored in a storage unit. The stored data can be used in testing the machined parts or preparing control data for use in the drawings of the sample products and NC (Numerical Control) processing thereof.

Figure 5:
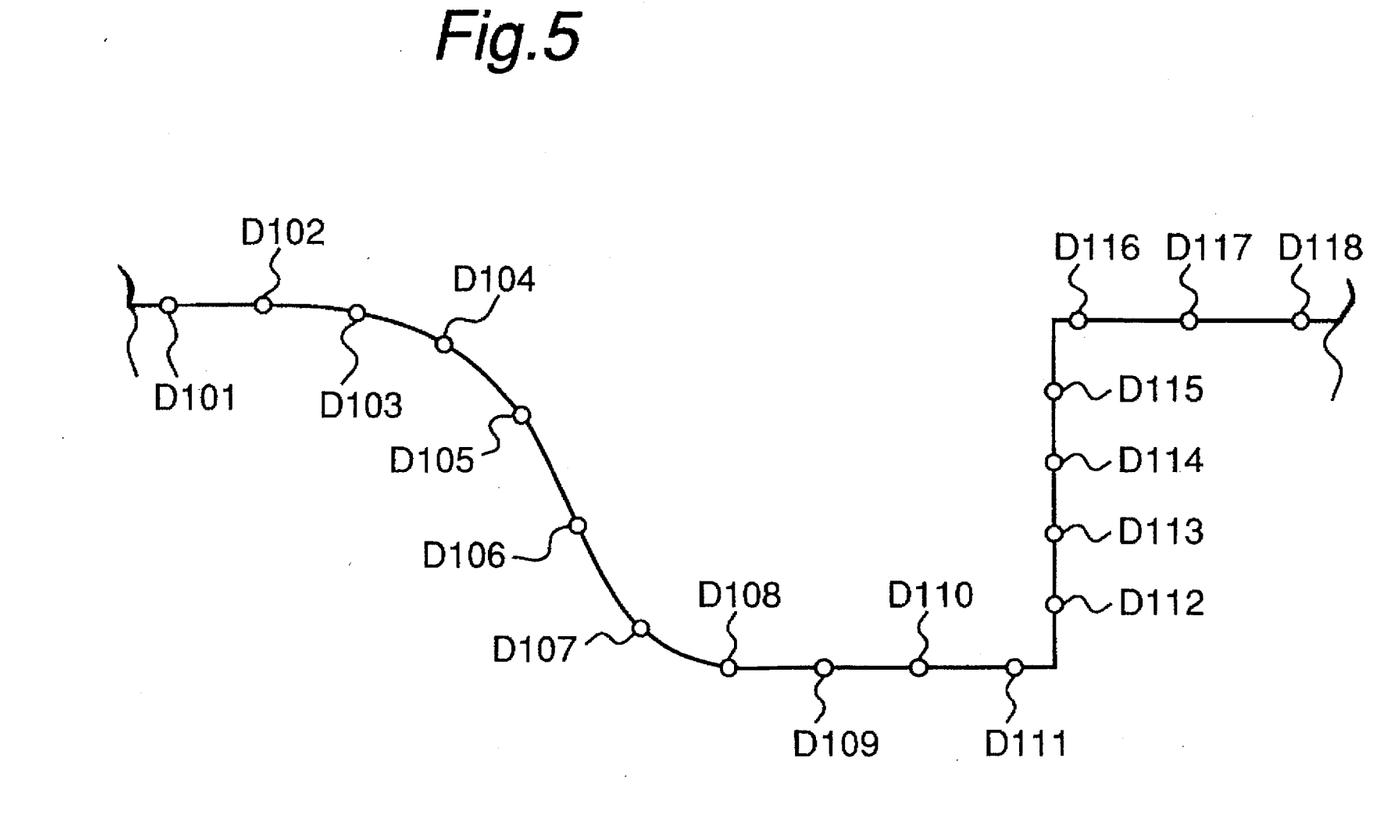
FIG. 5 is an explanatory view showing point data prior to thinning in the conventional method.

For instance, as seen in FIG. 5, point data D101 through D118 corresponding to a three-dimensional shape are obtained one after another along a surface having a three-dimensional shape, and are stored in a storage unit.

However, the number of point data to be stored in the storage unit is very large. Point data are extracted at short intervals to attain a correct correspondence to the shape of the surface having the original three-dimensional shape, so that the amount of data becomes very large. Thus, it is conceivable that the point data once stored in the storage unit are thinned so that particular point data only are restored and finally retained in storage. This arrangement leads to an increase in the total amount of information on the surface having the three-dimensional shape that can be stored and retained with the same storage capacity. Moreover, the arrangement also facilitates processing using the stored and retained point data.

Figure 6:
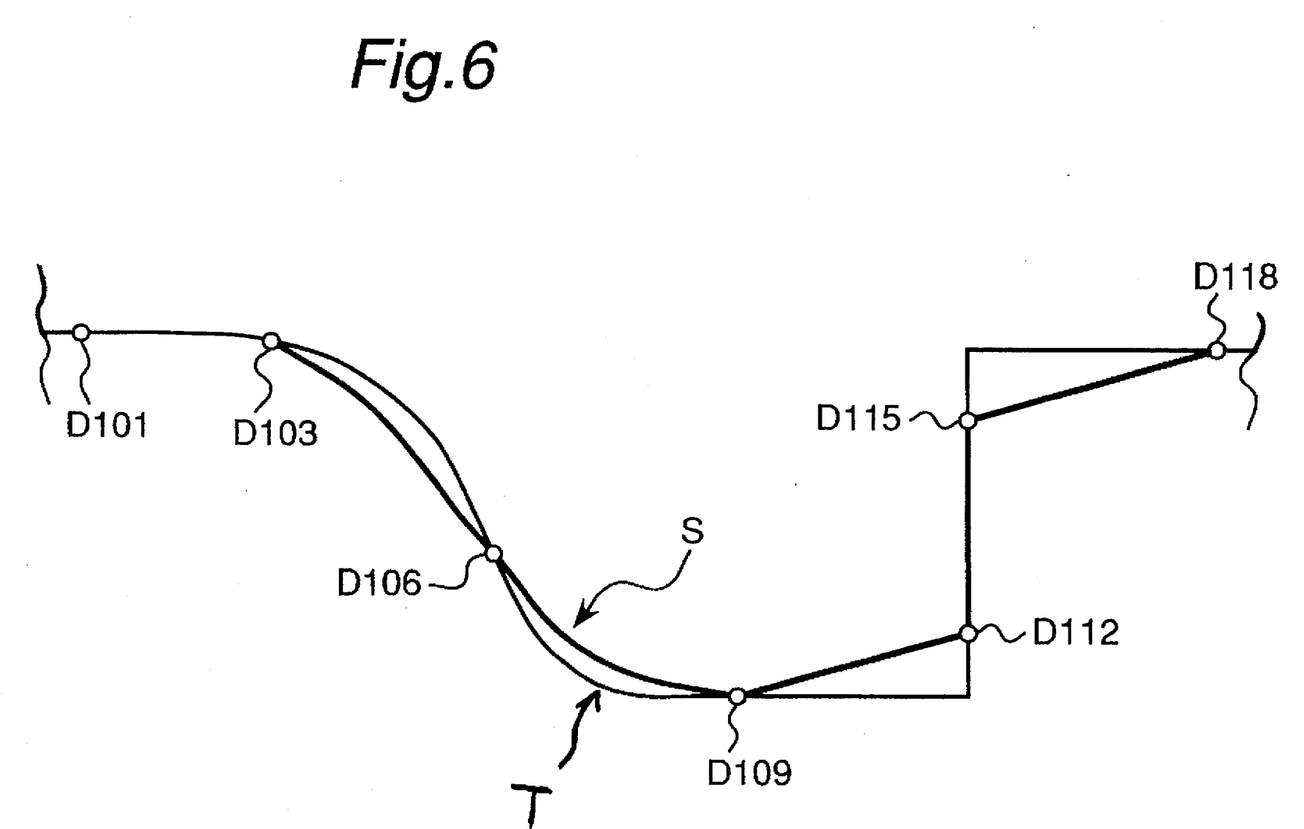
FIG. 6 is an explanatory view showing point data and reproduced shapes after thinning in a reference example.

Actually, if the point data are thinned at equal intervals so that only particular point data D101, D103, D106, D109, D112, D115, and D118 are stored and retained in the storage unit as seen in FIG. 6, the amount of point data that are finally left in the storage unit can be reduced.

However, even if the number of point data to be stored and retained can be reduced, only thinning the point data at equal intervals would give rise to another disadvantage in that a shape corresponding to the original shape could not be derived with high accuracy from the point data left in the storage unit. Although the original shape could be reproduced by a thick solid line S in FIG. 6 through graphical processing using a computer, the shape as shown by the thick solid line S in FIG. 6 does not correspond very well to the original shape as shown by a thin solid line T. In more detail, point data D111 and D116 at edge portions are omitted so that the edge portions cannot be reproduced correctly. Further, point data also are excessively omitted at rounded portions, so that the rounded portions cannot be reproduced correctly.

SUMMARY OF THE INVENTION

Accordingly, an object of the present invention is to provide a method for processing three-dimensional shape data, which allows decrease in the number of point data to be left for storage and retention in a storage unit and yet which improves accuracy of a shape that can be reproduced by the point data left in the storage unit.

In accomplishing these and other objects, according to one aspect of the present invention, there is provided a method for processing three-dimensional shape data, comprising the steps of:

obtaining a plurality of point data along a surface of an object having a three-dimensional shape;

taking out a point data from the obtained point data to be processed;

approximating each specified number of point data in the to-be-processed point data adjacent the taken-out point data by a polynomial and then finding two unit vectors at the taken-out point data;

finding an opening angle defined between the two found unit vectors;

comparing the found opening angle with a predetermined threshold value of the opening angle;

determining whether or not the found opening angle is not larger than the threshold value; and thinning the taken-out point data when the found opening angle is larger than the threshold value and not storing the taken-out point data in a storage unit, and leaving the taken-out point data without the thinning when the found opening angle is not larger than the threshold value and storing the taken-out point data in the storage unit.

According to another aspect of the present invention, there is provided a method for processing three-dimensional shape data, comprising the steps of:

obtaining a plurality of point data along a surface having a three-dimensional shape;

taking out a point data from the obtained point data to be processed;

approximating each specified number of point data in the to-be-processed point data adjacent the taken-out point data by a polynomial and then finding two unit vectors at the taken-out point data;

finding a distance between the two found unit vectors;

comparing the found distance with a predetermined threshold value of the distance;

determining whether or not the found distance is not larger than the threshold value; and thinning the taken-out point data when the found distance is not larger than the threshold value and not storing the taken-out point data in a storage unit, and leaving the taken-out point data without the thinning when the found distance is not larger than the threshold value and storing the taken-out Point data in the storage unit.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

Hereinbelow, an embodiment of the present invention is described. The present invention is, of course, not limited to the following embodiment.

Figure 1:
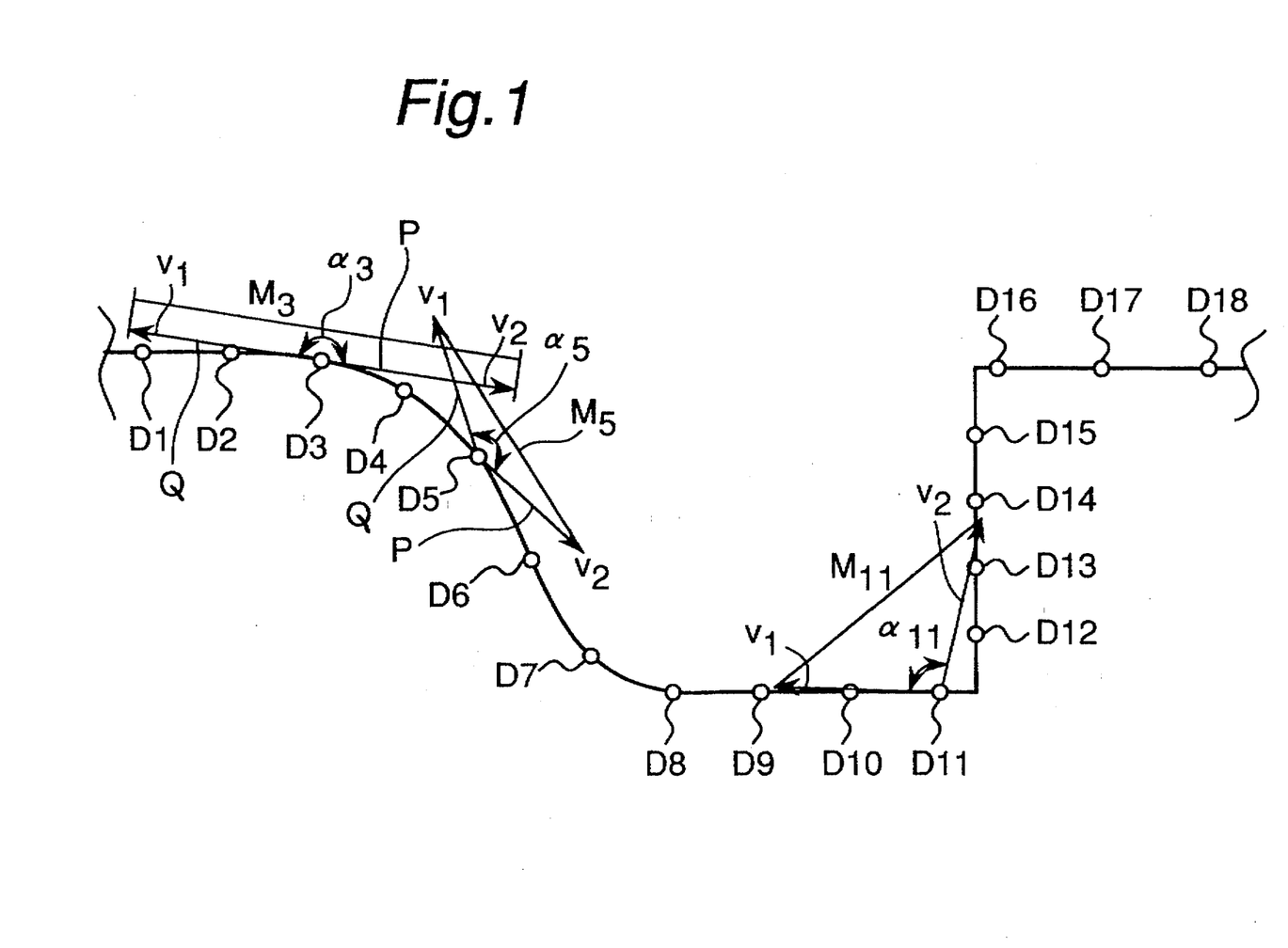
FIG. 1 is an explanatory view showing point data and a state of decision prior to the thinning process used in an embodiment of the present invention.

FIG. 1 shows point data corresponding to a three-dimensional shape in an embodiment of the present invention. Point data D1 through D18 are those obtained one after another along a surface having the three-dimensional shape by using a triangulation method, and stored in a storage unit as raw point data. The point data D1 through D18 in FIG. 1 are the same as the point data D101 through D118 in FIG. 5. A determination is made as to whether the point data D1 through D18 are applicable or inapplicable to thinning. If the point data is inapplicable to thinning, the data is stored and retained in the storage unit. If the point data is applicable to thinning, the data is not stored and retained in principle.

Figure 7:
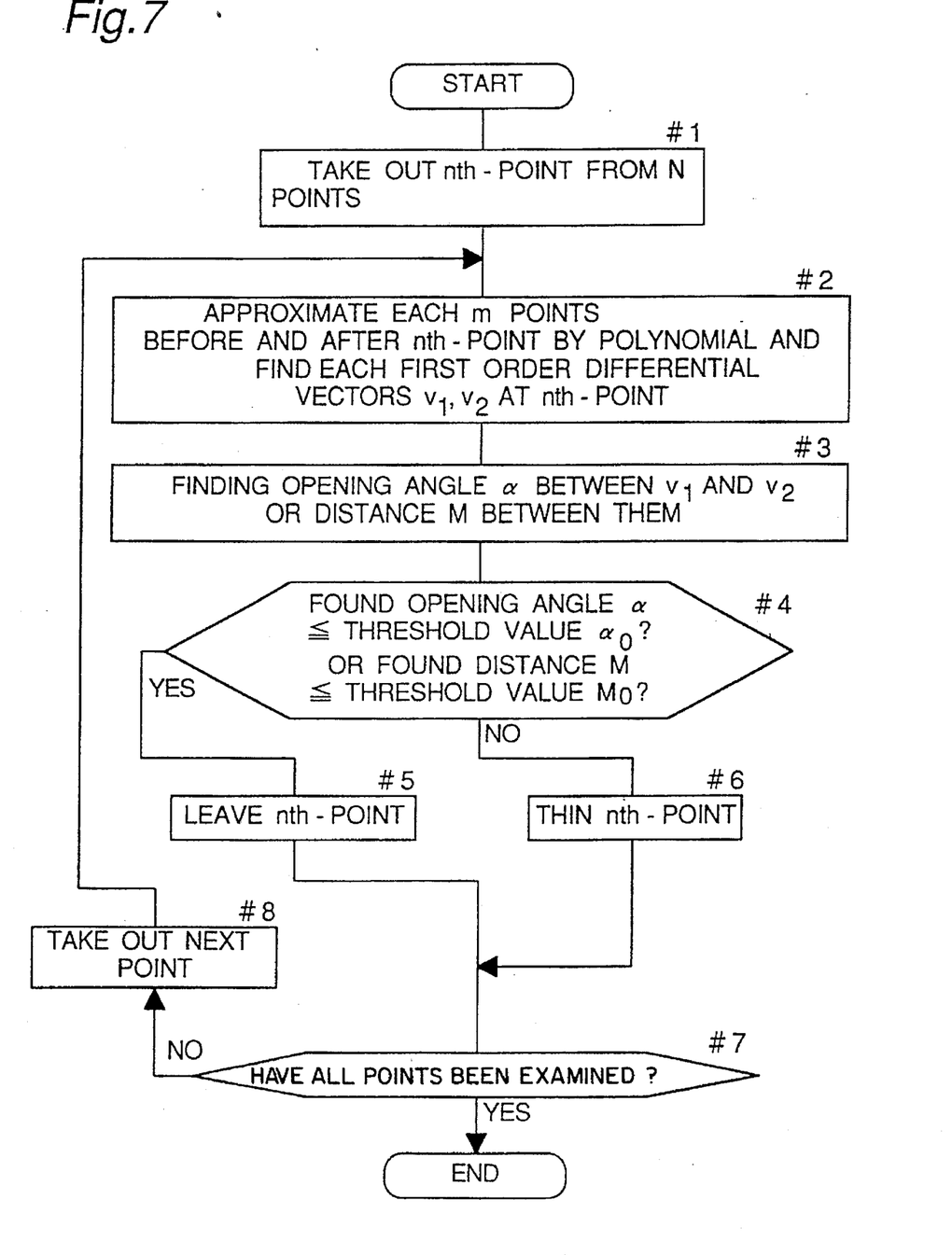
FIG. 7 is a flowchart of the method for processing a three-dimensional shape according to the embodiment.

First, the summary of the method for processing a three-dimensional shape according to the embodiment will be described below with reference to FIG. 7.

At step #1, an nth-point is taken out from N points. In FIG. 1, the total number of points is 18.

At step #2, each of m points before and after the nth-point is approximated by a polynomial and then each first order differential vectors (unit vectors) $v_1$, $v_2$ is found at the nth-point. In FIG. 1, the number m is three as described below. Normally, the number m is five so as to prevent erroneous detection.

At step #3, an opening angle $\alpha$ defined between the unit vectors $v_1$ and $v_2$ is found. Alternatively, a distance M between the unit vectors $v_1$ and $v_2$ can be found.

At step #4, the found value is compared with a specified value, i.e. a predetermined threshold value. That is, a determination is made as to whether found opening angle $\alpha$ is less than or equal to a threshold value $\alpha_0$ or the found distance M is less than or equal to a threshold value $M_0$.

At step #5, when the found value is larger than the threshold value, the nth-point is thinned.

At step #6, when the found value is not larger than the threshold value, the nth-point is left as is.

At step #7, a determination is made as to whether or not all points to be processed have been examined. When all of the points are examined, the program is terminated. When the all points have not been examined, the next point, i.e. a (n+1)th-point is taken out from the N points N, and then the program returns to step #2.

In the case of the embodiment, for each of point data, shape variation before and after a decision-point data which is decided whether or not to be applicable to thinning, is found based on a preceding-point data group composed of the decision-point data and the preceding 3-point data of the decision-point data and on a succeeding-point data group composed of the decision-point data and its succeeding 3-point data thereof. Then, calculation is performed by means of a computer or the like, so that if the shape variation is not less than a specified value, the point data is determined to be inapplicable to thinning, and otherwise the point data is determined to be applicable to thinning.

Now, assuming that the decision-point data to be considered is point data D5, in the case of the embodiment, the four pieces of point data D5 plus point data D2, D3, and D4 form the preceding-point data group, while the four pieces of point data D5 plus point data D6, D7, and D8 form the succeeding-point data group. First, from the preceding-point data group of the point data D2, D3, D4, and D5, an approximation line (also called an "imaginary" line herein) of the group of these point data is found by using a secondary approximation expression, and then a tangent line P which is tangent the approximation line at point data D5 is obtained in the form of a unit vector of a unit length. Meanwhile, another approximation imaginary line is found from the succeeding-point data group of the point data D5, D6, D7, and D8 by using a secondary approximation expression, and then a tangent line Q which is tangent the other approximation line also at the point data D5 is obtained in the form of a unit vector of the unit length. Since the approximation lines are approximated by the secondary expressions, the polynomial order can be changed as appropriate.

After the two tangent lines P and Q are found, a distance M between the ends of the two corresponding unit vectors V1 and V2 is calculated. The distance M is in proportion to an opening angle $\alpha$ between the tangent lines P and Q, so that the longer the distance M is, the greater the opening angle $\alpha$ is. Meanwhile, the opening angle $\alpha$ of the tangent lines P and Q is in inverse proportion to shape variation, so that the smaller the angle $\alpha$ is, the greater the shape variation is. Thus, a distance $M_0$ corresponding to the opening angle of the tangent lines P and Q corresponding to a shape variation not less than a specified shape is previously determined.

That is, in this embodiment, since the processing method is used for detecting edges in the three-dimensional shape, the specified shape is "edge". The determination of whether or not a shape variation is not less than the specified shape is used to determine whether or not a shape to be processed is an edge. The "edge" means a portion having a corner. In order to detect an edge, the opening angle $\alpha$ is used instead of the distance M, and the specified value, i.e. threshold value $\alpha_0$ of the opening angle $\alpha$ is 120 degree.

On this arrangement, point data where the calculated opening angle $\alpha$ is not larger than the threshold value $\alpha_0$ determines that a shape variation not less than the specified shape, i.e. a shape variation which shows an edge, has been recognized and regarded as inapplicable to thinning, and then, the point data is stored and retained in the storage unit. The other point data where the calculated opening angle $\alpha$ is larger than the threshold value $\alpha_0$ means that a shape variation does not show an edge, and then such point data are recognized and regarded as applicable to thinning, where the point data are not stored and retained. In this way, similar calculation and decision is performed repeatedly upon each piece of point data, during which point data where the opening angle $\alpha$ is calculated to be not larger than the specified value are stored in the storage unit.

For example, in FIG. 1, at the point data D3, the opening angle $\alpha_3$ is 180 degree and is larger than the threshold value of 120 degrees. Then, the point data D3 is applicable to thinning and is not stored in the storage unit. At the point data D5, the opening angle $\alpha_5$ is 120 degree and is equal to the threshold value of 120 degrees. Then, the point data D5 is not applicable to thinning and is stored in the storage unit. At the point data D11, the opening angle $\alpha_{11}$ is 100 degree and is less than the threshold value of 120 degree. Then, the point data D11 is not applicable to thinning and is stored in the storage unit. The point data D11 is close to a corner and is considered as point data showing an edge. Therefore, the point data D11 is not removed by the thinning process and is left.

It is of course possible to calculate the distance M between the ends of the tangent lines P and Q, and thereby effect the same processing.

Figure 2:
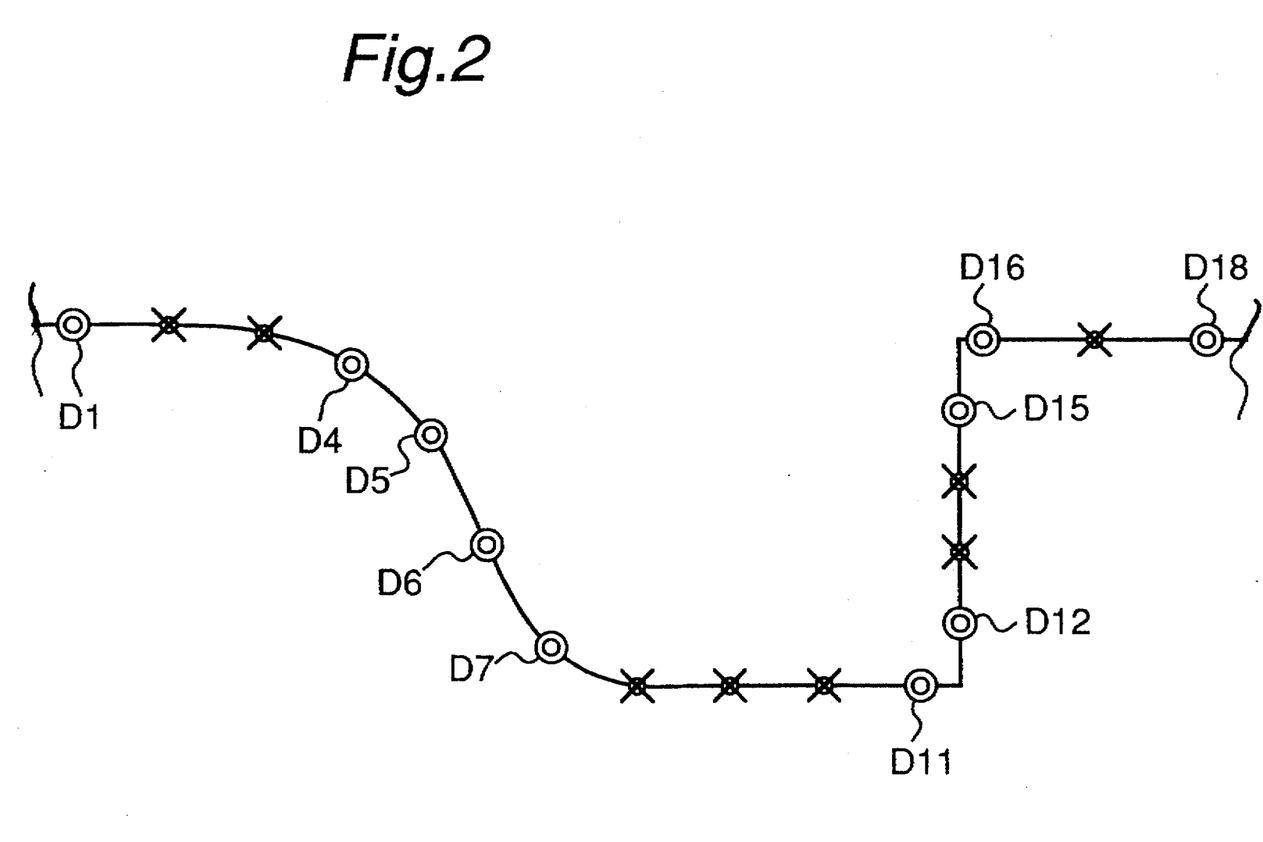
FIG. 2 is an explanatory view showing point data after the thinning process in the embodiment.

FIG. 2 shows the point data stored and retained in the storage unit as a result of the processing which are shown by double circles. The point data with large shape variations such as D11, D12, D15, D16 have all been picked up without being omitted, so that the shape can be reproduced with good accuracy.

The method for processing three-dimensional shape data according to the present embodiment can be applied to point data that have been stored in the storage unit, and then the storage contents of the storage unit are updated. Also, the method can be applied to point data that are sequentially transmitted from the apparatus for obtaining three-dimensional shape data, and then the point data are thinned and stored in the storage unit.

A preceding-point data group is exemplified by a group of 4-point data composed of a taken-out point data (a current decision-point data) and its preceding 3-point data. A succeeding-point data group is exemplified by a group of 4-point data composed of the current decision-point data and its succeeding 3-point data. However, these groups are not limited to the above examples. Alternatively, the preceding-point data group is exemplified by a group of 2-point data composed of the current decision-point data and its preceding 1-point data, while the succeeding-point data group is exemplified by a group of 2-point data composed of the current decision-point data and its succeeding 1-point data. Further, the preceding-point data group is exemplified by a group of 3-point data composed of current decision-point's preceding 3-point data without including the current decision-point data, while the succeeding-point data group is exemplified by a group of 3-point data composed of current point's succeeding 3-point data without including the current decision-point data.

The specified functional expression is exemplified by a NURBS (Non Uniform Rational B-Spline) function, Chebyshev's polynomial, and the like. The "NURBS" is disclosed in "BASIS AND APPLICATION OF THREE-DIMENSIONAL CAD", page 57, by Hiroshi TORIYA and Hiroaki CHIYOKURA, which was published by Kyoritsu Shuppan Kabushiki Kaisha on Feb. 25, 1991.

The greater the shape variation, the smaller the angle formed by the two tangent lines (degree of openness). When no shape variation is involved, the angle of the two tangent lines becomes a maximum (180°). Naturally, a proper reference angle is previously set in accordance with the object for making comparisons and decisions.

As described below, the point data corresponding to a three-dimensional shape are obtained by using a triangulation method which takes advantage of a phenomenon that a position where a scanning laser beam reflected by an object is detected varies in proportion to a difference between a height position of a reflected point where the scanning laser beam is reflected and a height position of a reference point. Otherwise, the point data can also be those obtained by using a moire-CT image processing.

Figure 4:
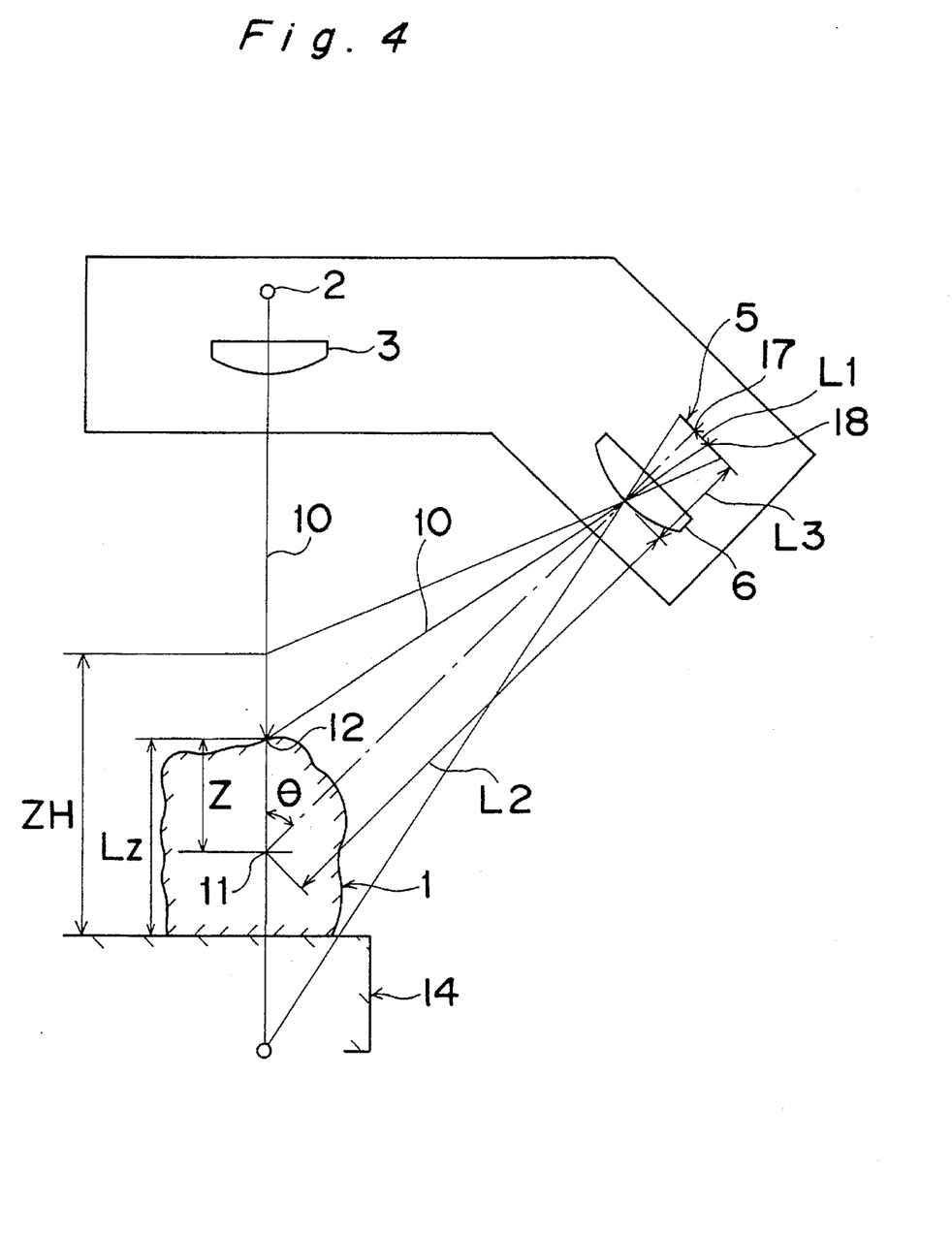
FIG. 4 is an explanatory view showing the principle of the triangulation method.

As shown in FIG. 4, a laser beam 10 is supplied from a light projector 2 to the surface of an object 1, the surface having a three-dimensional shape, via a projection lens 3. The laser beam 10 is reflected by the surface of the object 1, entering a CCD camera photodetector 5 via a photoreception lens 6. In this optical system, when the laser beam 10 is reflected at the height of a reference point 11, the reflected laser beam 10 will be detected at a reference position 17 of the CCD camera photodetector 5. Meanwhile, the laser beam 10 reflected at a point 12 of the surface of the object 1 having a height different from that of the reference point 11 will be detected at a position 18 which is away from the reference position 17 of the CCD camera photodetector 5 by a distance L1. In this arrangement, the position where the reflected laser beam 10 is detected varies in proportion to the difference between the height position of the measuring point 12 and the height position of the reference point 11. As a result, the height position (position on the Z-axis) of the measuring point 12 can be found.

For actual calculation of a surface shape with using this triangulation method, the surface of the object 1 is scanned with the laser beam 10. The range of this scanning is such that the reference position 17 where the reflected laser beam 10 is detected falls upon a reference range. The surface within such a range that the photodetection position of the reflected laser beam 10 falls into the reference range is referred to as a reference surface. The shape of the reference surface can be set to various forms such as a curved surface or a flat surface, by controlling the shape of the lens or the like, for example, as shown in Japanese Laid-Open Patent Publication No. 64-26816. The measuring point 12, which is each point to be measured by the scanning within the reference surface, has a height position equal to or different from that of the reference point 11, in the reference surface. Since a distance L2 between the photoreception lens 6 and the reference point 11, a distance L3 between the photoreception lens 6 and the reference position 17, and an angle θ formed by a line connecting the photoreception lens 6 and the reference point 11 with each other and a line connecting the projection lens 3 and the reference point 11 with each other are previously known, a distance Z between the measuring point 12 on the surface of the object 1 and the reference point 11 can be found immediately. In this way, height positions of measuring points whose distance Z from the reference point 11 two-dimensionally differs from one another are obtained one after another by the scanning with the laser beam 10. These point data are accumulated, so that a three-dimensional shape can be recognized. The position on the X- and Y-axes (two-dimensional position) of each measuring point 12 is normally expressed as a distance Lz resulting from adding the distance between the reference point 11 and a mounting table 14 to the aforementioned distance Z. It is noted that reference character ZH in FIG. 4 denotes the measurable range.

Figure 3:
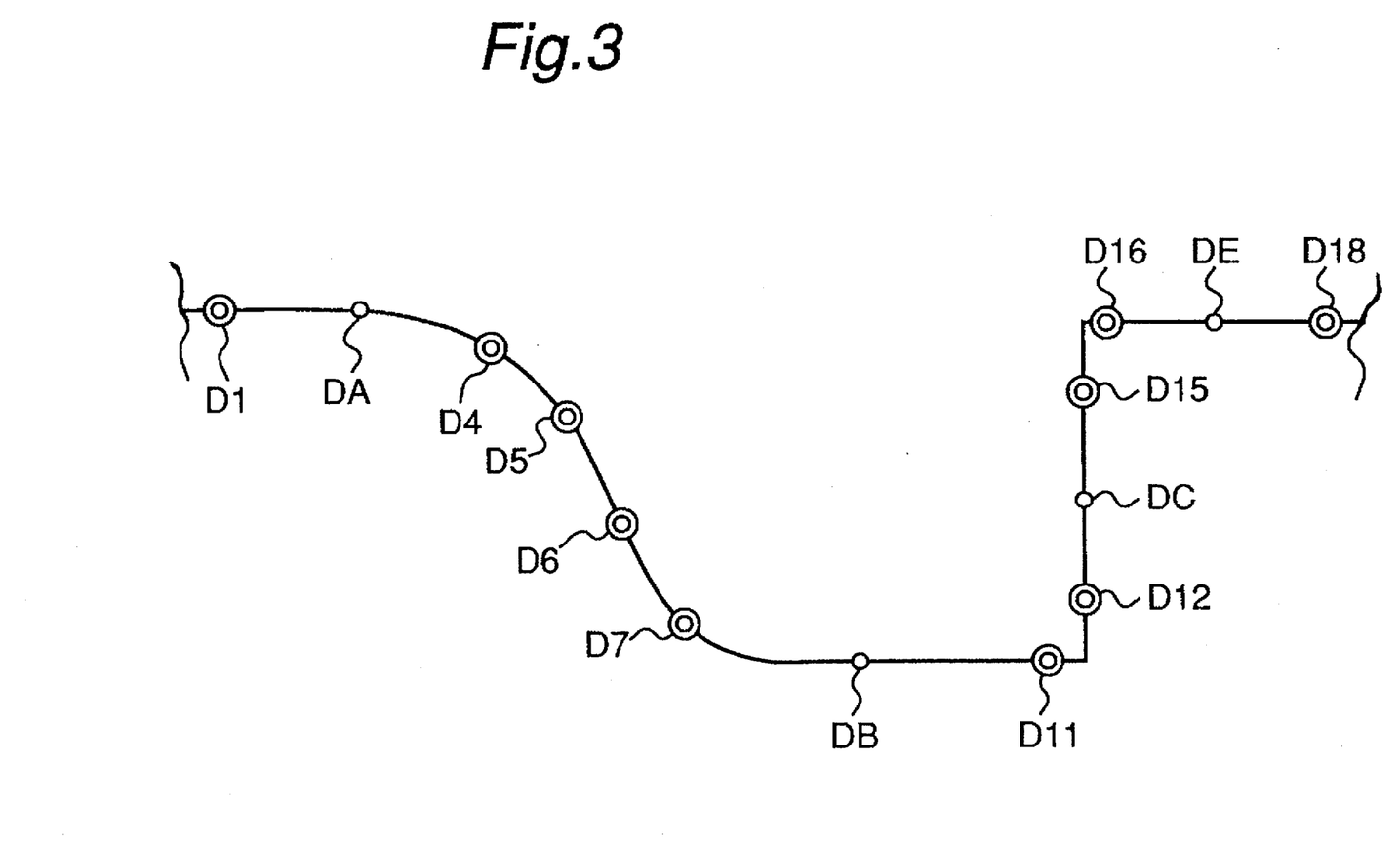
FIG. 3 is an explanatory view showing a case where interpolation data are also inserted and stored in the embodiment.

In addition, as a result of applying the present embodiment, unnecessary portions of point data are thinned before the point data are stored in the storage unit. For sequences of point data that do not exhibit a shape variation which is not less than a specified value but which continue to be thinned, proper interpolation data may be inserted at places. That is, as seen in FIG. 3, when the decision that point data is applicable to thinning continues over a range more than a specified interval, it is also possible to store and retain only part of the point data to be thinned or to forcedly insert point data between those point data so that interpolation data DA, DB, DC, and DE are also stored in the storage unit. Of course, the number of data to be inserted is a number smaller than the number of point data that have been decided to be applicable to thinning. Interpolation data can be inserted in the following way, for example. An approximation line by subjecting the point data D6, D7, D11, and D12 to a NURBS curve approximation, and then data of proper positions are determined as point data based on the approximation line. Then, the resulting point data are inserted as the interpolation data DA, DB, DC, and DE.

When a video camera is used as one example of the object 1 and all the point data are snored and retained, in which case a storage unit with a 2MB storage capacity is necessitated, it has been confirmed that the method for processing three-dimensional shape data according to the embodiment allows storage and retention with an approximately 70KB storage capacity even if the aforementioned insertion of interpolation data is involved. The number of the point data before the thinning was 138,360 and the number of the point data after the thinning was 8,456.

The surface having a three-dimensional shape, which is the object of the present invention, is exemplified by surfaces of machined parts and sample products, a human body and teeth, and the like, but of course are not limited to these.

With the use of the method for processing three-dimensional shape data of the present invention, necessary point data can be properly selected out of all the point data and stored into the storage unit by properly thinning unnecessary point data. Thus, the number of point data to be stored and retained in the storage unit can be reduced with the accuracy of the reproduced shape being maintained. As a result, the storage capacity required can be reduced and the subsequent processing is facilitated.

Accordingly, in the case of FIG. 5, point data D111 and D116 are also stored and retained in the storage unit, so that the edge can be restored correctly.

In the present invention, respective imaginary or approximation lines matching the shapes of the preceding-point data group and the succeeding-point data group are found by for each of the preceding-point data group and the succeeding-point data group to a specified functional expression, and thereafter, with respect to their corresponding imaginary lines, tangent lines are obtained passing through decision-point data in which a determination is to be made as to whether or not they applicable to a shape variation before and after the decision-point data is determined based on the angle formed by the two tangent lines, and thus proper decision results can be advantageously obtained without requiring any particularly complex algorithm.

With continuing decisions that the point data is applicable to thinning, if interpolation data of a number smaller than the number of thinning point data between those point data are stored in the storage unit as data inapplicable to thinning, then the point data become easy to advantageously utilize. The reason for applying this method is that intervals devoid of data that are too long may cause difficulties in processing.

In the present invention, when the triangulation method is used to obtain data, data corresponding to a three-dimensional shape can be obtained simply and promptly, and moreover commercially available apparatus are also usable. Thus, the present invention becomes easier to advantageously embody.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A method for processing three-dimensional shape data, comprising:

a first step of obtaining a plurality of data points positionally indicative of respective surface points located along a surface of an object having a three-dimensional shape;

a second step of extracting one of said data points as a to-be-processed data point;

a third step of extracting a predetermined plural number of first data points among said data points which precede said to-be-processed data point, and extracting a predetermined plural number of second data points among said data points which succeed said to-be-processed data point;

a fourth step of subjecting said first data points and said to-be-processed data point to a polynomial approximation to obtain a first approximated line of said first data points and said to-be-processed data point;

a fifth step of subjecting said second data points and said to-be-processed data point to a polynomial approximation to obtain a second approximated line of said second data points and said to-be-processed data point;

a sixth step of obtaining a first unit vector which is tangential said first approximated line and which extends from said to-be-processed data point, and a second unit vector which is tangential said second approximated line and which extends from said to-be-processed data point;

a seventh step of finding an opening angle between said first and second unit vectors;

an eight step of comparing said opening angle with a predetermined threshold opening angle value;

a ninth step of thinning said to-be-processed data point and not storing said to-be-processed data point in a storage unit when said opening angle is larger than said threshold opening angle value, and leaving said to-be-processed data point as is without thinning and storing said to-be-processed data point in the storage unit when said opening angle is not larger than said threshold opening angle value; and, a tenth step of repeating said second through ninth steps for each of the remaining data points such that each remaining data point is extracted and processed as said to-be-processed data point.

2. The method as claimed in claim 9, further comprising a step of storing in the storage unit interpolated data points of a number which is smaller than a number of data points contained within a range having a continuous succession of data points that have been determined to be thinned in said ninth step.

3. The method as claimed in claim 1, wherein the data points corresponding to the three-dimensional shape are obtained by using a triangulation method in which a position where a scanning laser beam reflected by the object is detected varies in a reflected point where the scanning laser beam is reflected from the reflected point and a height position of a reference point.

4. A method for processing three-dimensional shape data, comprising:

a first step of obtaining a plurality of data points positionally indicative of respective surface points located along a surface of an object having a three-dimensional shape;

a second step of extracting one of said data points as a to-be-processed data point;

a third step of extracting a predetermined plural number of first data points among said data points which precede said to-be-processed data point, and extracting a predetermined plural number of second data points among said data points which succeed said to-be-processed data point;

a fourth step of subjecting said first data points and said to-be-processed data point to a polynomial approximation to obtain a first approximated line of said first data points and said to-be-processed data points;

a fifth step of subjecting said second data points and said to-be-processed data point to a polynomial approximation to obtain a second approximated line of said second data points and said to-be-processed data point;

a sixth step of obtaining a first unit vector which is tangential said first approximated line and which extends from said to-be-processed data point, and a second unit vector which is tangential said second approximated line and which extends from said to-be-processed data point;

a seventh step of finding a distance between ends of said first and second unit vectors;

an eight step of comparing said distance with a predetermined threshold distance value;

a ninth step of thinning said to-be-processed data point and not storing said to-be-processed data point in a storage unit when said distance is larger than said threshold distance value, and leaving said to-be-processed data point as is without thinning and storing said to-be-processed data point in the storage unit when said distance is not larger than said threshold distance value; and, a tenth step of repeating said second through ninth steps for each of the remaining data points such that each remaining data point is extracted and processed as said to-be-processed data point.

5. The method as claimed in claim 4, further comprising a step of storing in the storage unit interpolated data points of a number which is smaller than a number of data points contained within a range having a continuous succession of data points that have been determined to be thinned in said ninth step.

6. The method as claimed in claim 4, wherein the data points corresponding to the three-dimensional shape are obtained by using a triangulation method in which a position where a scanning laser beam reflected by the object is detected varies in a reflected point where the scanning laser beam is reflected from the reflected point and a height position of a reference point.

* * * * *